April 9, 1929.    S. MUNSON    1,708,845
AIR REGULATOR AND WINDSHIELD ADJUSTER
Filed Sept. 19, 1927    2 Sheets-Sheet 2
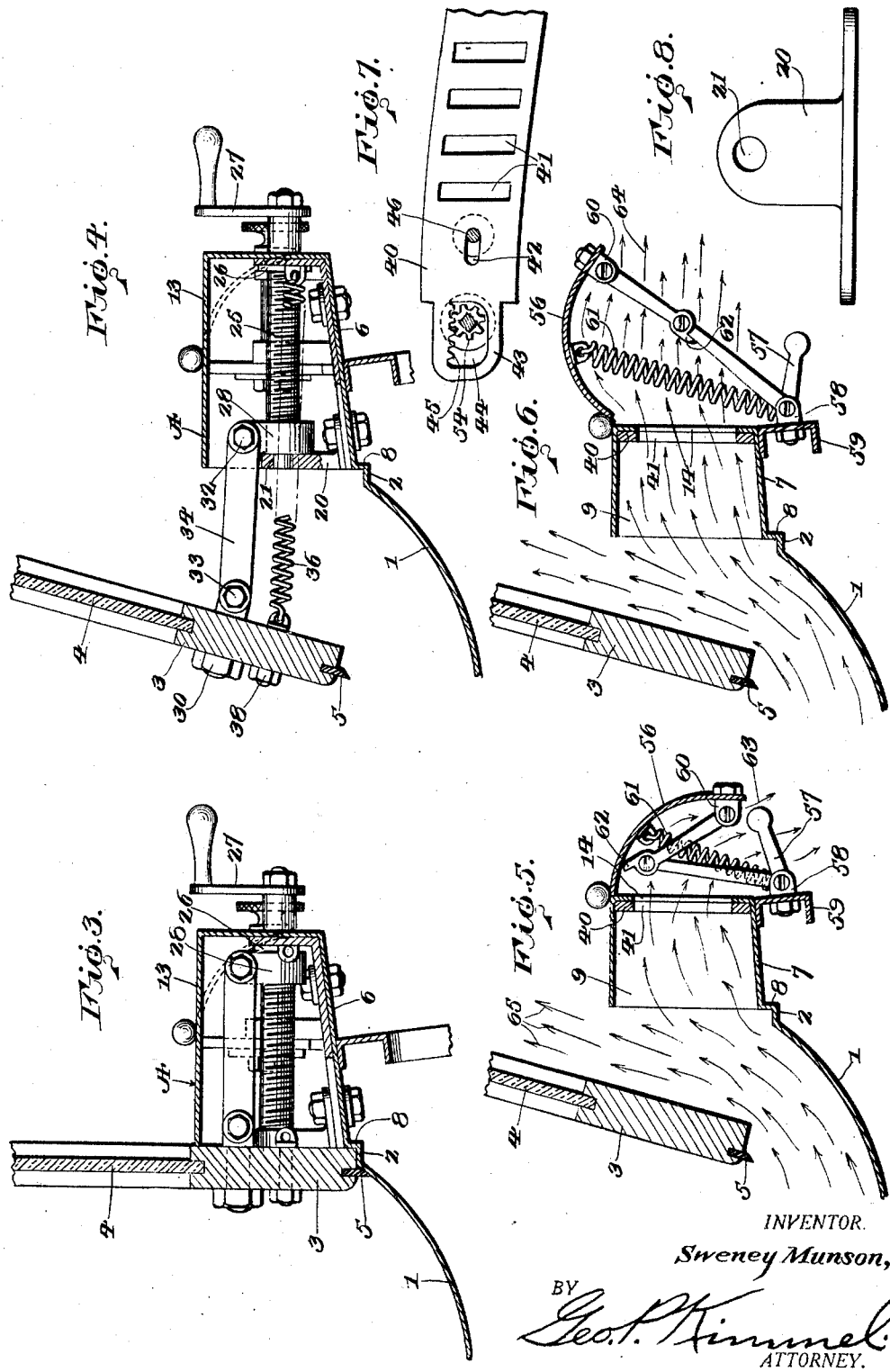
INVENTOR.
Sweney Munson,
BY
Geo. P. Kimmel
ATTORNEY.

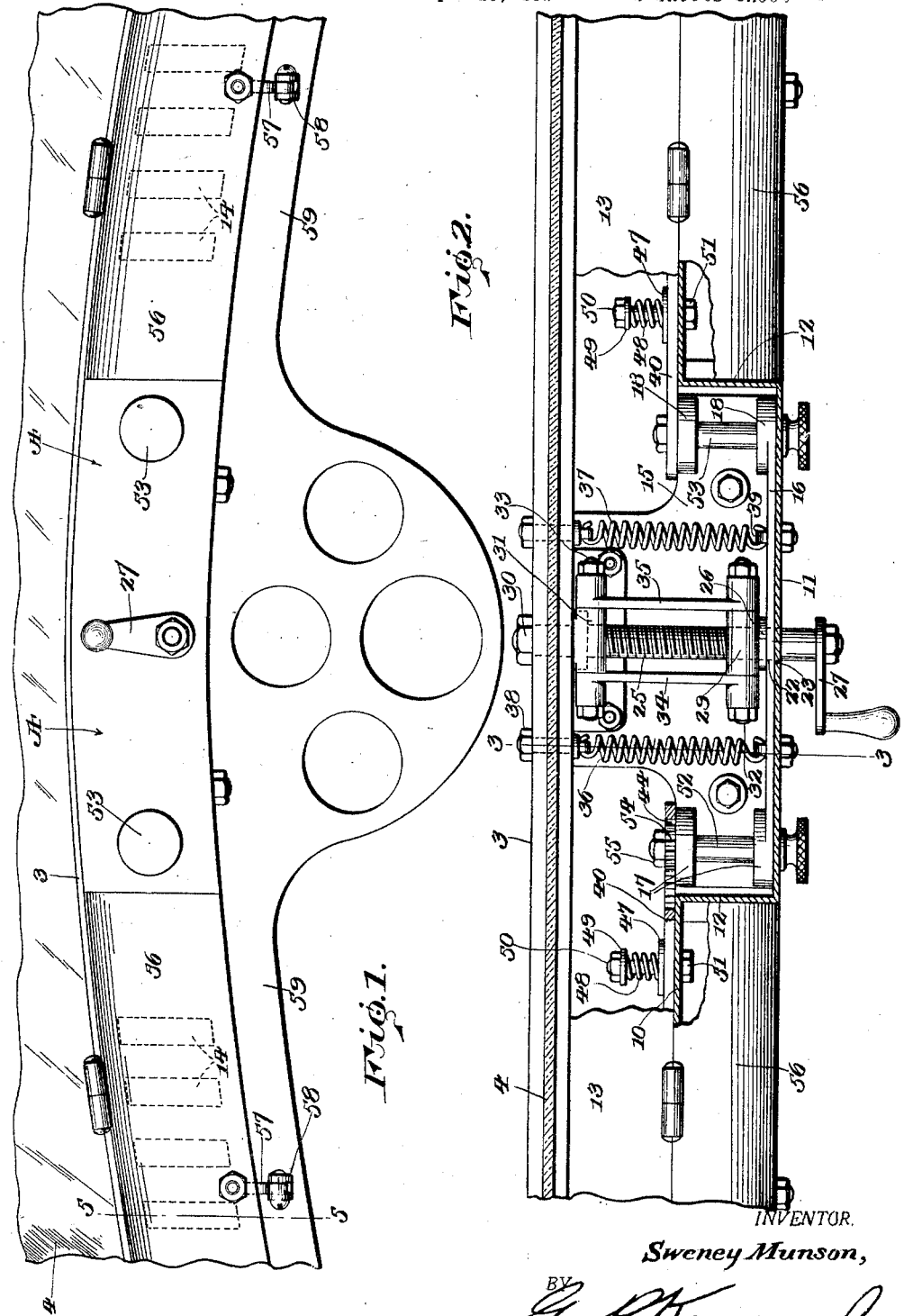

Patented Apr. 9, 1929.

1,708,845

UNITED STATES PATENT OFFICE.

SWENEY MUNSON, OF SCAMMON, KANSAS.

AIR REGULATOR AND WINDSHIELD ADJUSTER.

Application filed September 19, 1927. Serial No. 220,550.

This invention relates to an adjuster designed primarily for use in connection with windshields of motor vehicles, but it is to be understood that an adjuster, in accordance with this invention, may be employed in any connection for which it is found applicable, and the invention has for its object to provide, in a manner as hereinafter set forth, a device of the class referred to for expeditiously and conveniently adjusting a windshield to the desired extent when occasion requires and further for maintaining the windshield in adjusted position.

A further object of the invention is to provide, in a manner as hereinafter set forth, an adjusting device for windshields for directing the fresh air straight back, without striking the face, as well as for admitting fresh air without inconveniencing the occupants of the vehicle and further directing the incoming air in a manner to keep the feet cool in hot weather and at the same time allow fresh air to pass over head.

A further object of the invention is to provide, in a manner as hereinafter set forth, an adjuster to enable the admittance of fresh air into the vehicle and at the same time eliminate the air current coming direct into the driver's face as the same affects the eyes and vision on long drives.

A further object of the invention is to provide an adjuster, in a manner as hereinafter set forth, for admitting fresh air in a car, especially in an enclosed one, during a warm rain and at the same time preventing the entrance of the rain in the car on the admission of the fresh air.

A further object of the invention is to provide, in a manner as hereinafter set forth, an adjuster providing for selectively directing the admission of fresh air when desired by the driver or passenger or both.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view in elevation of an adjuster or air regulator in accordance with this invention and with the same connected with the instrument board of a vehicle.

Figure 2 is a fragmentary view in sectional plan.

Figure 3 is a section on line 3—3 Figure 2 with the windshield in closed position.

Figure 4 is a section on line 3—3 Figure 2 with the windshield adjusted.

Figure 5 is a section on line 5—5 Figure 1 with the windshield adjusted and with the device set to direct travel of the fresh air over head and against the feet of the driver or passenger.

Figure 6 is a view similar to Figure 5 on line 5—5 Figure 1 but with the device adjusted to direct the air over head and straight back.

Figure 7 is a fragmentary view in elevation of one of the ventilating slides.

Figure 8 is an elevation of the support for one end of the operating shaft.

Referring to the drawings in detail 1 denotes the cowl of a motor vehicle having its rear end formed with a flange 2 providing a seat for the bottom frame member 3 of the windshield and the latter includes a transparent panel or glass 4. The width of the flange 2, in cross section, is less than the width of the frame member 3 and the latter has a depending packing strip 5 which abuts against the cowl 1, to prevent entrance of air when the windshield is mounted on the seat 2.

Connected with or formed integral with the cowl 1, is an open front housing having the intermediate portion 6 of its bottom of greater cross sectional length than the cross sectional length of either of the end portions 7, 8 of the bottom of the open front housing and the latter is referred to generally at A. The forward end of the bottom of the housing A, is provided with a depending flange 8 which is shown as integral with the flange 2 and provides an abutment for the frame member 3. Each end of the housing A is indicated at 9. The rear wall of the housing A comprises a pair of end portions 10, a central portion 11, and a pair of intermediate portions 12 which are disposed at right angles with respect to the portions 10 and terminate in the central portion 11 whereby the latter will be offset rearwardly with respect to the portions 10. The top wall of the housing is indicated at 13 and is integral with the portions 10, 11 and 12 of the rear wall of the housing, as well as connected to the end walls 9 thereof. Each portion 10 of the rear wall is formed with a series of spaced, vertically disposed rectangular slots 14 and provides a set of ventilating openings or inlet openings for the passage of air into the interior of the vehicle. The top wall 13 of the housing A conforms in contour to that of the bottom wall 6 of said housing, but said bottom wall extends rearwardly at an upward inclination, see Figures 3 and 4.

The setting up of the housing in the manner referred to provides it with a central portion of greater width than the outer portions thereof, and with the rear of each outer portion positioned forwardly with respect to rear of the central portion whereby the latter will project rearwardly of the outer portions.

Secured upon the portion 6 of the bottom wall of the housing A, and also to the portion 11 of the rear wall of said housing, is a bracket member comprising a base portion 15 and an upstanding end portion 16 which is positioned against the inner face of the portion 11 of the rear wall of the housing A. The portion 15 is mounted on the portion 6 of the bottom wall of the housing A. The portions 15 and 16 of the bracket are fixedly secured to the housing A. The portion 15 of the bracket extends to the open front of the housing and has its intermediate portion of greater cross sectional length than the end portions thereof. The cross sectional length of the end portions of the portion 15 of the bracket is substantially the same as the width of the portions 12 of the rear wall of the housing A. The bracket, at each end, is formed with a pair of opposed bearings and the bearings of one pair are indicated at 17 and those of the other pair at 18. The purpose of the bearings will be presently referred to.

Secured upon the upper face of the portion 15 of the bracket, at the open end of the housing A and centrally of the latter is an upstanding support 20 provided with an opening 21 and the latter opposes openings 22, 23, the former being formed in the portion 16 of the bracket and the latter in the portion 11 of the rear wall, see Figure 2. Extending through the openings 22, 23 and journaled in the opening 21, is a threaded operating shaft 24, provided with a collar 26, which abuts against the inner face of the portion 16 of the bracket. The shaft 25 projects rearwardly with respect to the portion 11 of the rear wall of the housing A and carries an operating handle 27.

Mounted on the shaft 25 and threadedly engaging therewith is a sliding collar 28 having formed integral with its top a tubular member 29 which is disposed at right angles with respect to the direction of the shaft 25. Connected to the frame member 3, of the windshield, is a coupling member 30 having a tubular head 31 arranged rearwardly of the member 3. Extending through the member 29 is a pivot bolt 32 and extending through the head 31 is a pivot bolt 33. The bolts 32 and 33 are suitably secured to the member 29 and head 31 respectively. The bolts 32 and 33 project a substantial distance from each end of the member 26 and head 31 respectively. The bolt 32 is connected to the bolt 33 by a pair of links 34, 35. The frame member 3 of the windshield is connected to the upstanding portion 16 of the bracket by a pair of coiled controlling springs 36, 37 between which are arranged the links 34, 35. One end of each of the controlling springs is coupled with the frame member 3, by a holdfast device 38 and one end of each of the springs is coupled with the portion 16 of the bracket by a holdfast device 39.

The construction referred to includes an adjusting device for windshields and such device includes the shaft 25, collar 28, and link connections between the collar 28 and the frame member 3. The foregoing construction further includes spring controlling elements for the windshield and said elements are formed by the springs 36, 37. When revolving the handle 27 in one direction, the shaft 25 will be carried therewith, and if the movement of the shaft be in a clock-wise direction, the collar 26 will move towards the frame member 3, carrying the links 34, 35 therewith, and shifting the windshield frame 3 from off the seat 2 and such action being had against the controlling springs 36, 37, and these latter provide an anti-rattling means not only for the windshield when adjusted, but also for the elements of the adjusting device.

The openings 14 formed in each end portion 10 of the rear wall, are controllable and for such purpose a bodily shiftable controlling slide is associated with each portion 10. The slide comprises a rectangular body portion 40, formed with spaced vertically disposed rectangular slots 41 and also formed with a lengthwise extending slot 42 and with an extension 43 formed with an opening 44, having the top wall thereof toothed as at 45 to provide a rack. The slide 40 is slidably connected to the portion 10 and for such purpose a spring controlled coupling means is employed and which comprises a headed bolt 46, a disc 47 mounted on the bolt, a controlling spring 48 carried by the bolt, a washer 49 positioned on the bolt and against a nut 50 on the inner end of the bolt. The spring is interposed between the washer 49 and the disc 47 and the latter is positioned against the forward side of the slide. The bolt 46 extends through the slot 42 and the head 51 thereof bears against the rear face of the portion 10 of the rear wall. The said means not only provides for coupling the slide 40, against the portion 10 of the rear wall, but also maintains the same in close contact therewith, through the medium of the spring 48. The nut 50 adjusts the tension of the spring 48.

Journaled in the bearings 17 and also journaled in the bearings 18 is a rotatable shaft and said shafts are indicated at 52. The inner end of each of said shafts is provided with a pinion 54 which meshes with a rack 45 and provides for the shifting of the slide. The inner end of each shaft carries a retaining nut 55. The slides are shifted for the purpose of controlling the openings 14 formed in the end portions 10 of the rear walls.

Hinged to each end portion 10 of the rear wall of the housing A is a curved deflector 56, operated from a link and lever mechanism referred to at 57, and said mechanism is pivotally supported by a lug 58, carried by the instrument board 59 and is also pivotally connected to a lug 60 carried by the deflector 56 at the outer end thereof. The mechanism 57 is spring controlled, and its controlling spring is indicated at 61, and said spring is attached to the deflector 56 and to the lug 58. The mechanism 57 includes a stop 62, to arrest the extending movement thereof. The deflectors 56 provide for the air to travel in the direction of the arrows 63, Figure 5 for the purpose of cooling the feet of the driver or an occupant of the vehicle, and further the deflectors provide means for directing the air in the direction of the arrows 64 whereby the air is caused to travel in a straight rearward direction. When the windshield is shifted to the position shown in Figures 5 and 6, the air will also travel upwardly in overhead direction and the direction is indicated by the arrows 65. The instrument board 59 is secured to the bottom 7 of the housing A. The deflectors 56 are independently operated. The incoming air does not travel in the direction of the arrows 63, 64, unless the slots 41 are in registration with the openings 14. The slides control the desired amount of air admitted through the openings 14, or can cut off the supply of air entirely through such openings. When the air travels in the direction of the arrows 64, it does not strike the face of the driver of the vehicle or an occupant thereof. The slides provide for selectively controlling the passage of air through the end portions 10 of the rear wall of the housing A. The deflectors 62 provide for selectively directing the air in the desired direction which travels through the end portions 10 of the rear wall of the housing A. One of the slides can be arranged in closed position with one set of openings 14, and the air can then enter through the other end portion 10 of the housing A, if the openings in said end portions 10 are not closed by a slide. The deflectors 62 provide means for selectively directing the air straight back, without striking the face of the driver or the occupants and also for directing the air to cool the feet of the driver or occupants. Both set of openings in the rear wall of the housing A, can be closed, and when the windshield is adjusted to the position as shown in Figure 5, incoming air will then travel only in the direction of the arrows 65.

The windshield, slides and deflectors 62 can be conveniently adjusted to obtain the action hereinbefore referred to and the device provides thoroughly efficient means for ventilating purposes, not only with respect to the driver of the vehicle, but also to an occupant on the front seat, as well as the other occupants in the car. Therefore, it is thought the many advantages of an adjuster, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:

1. In an adjuster for windshields of motor vehicles an open front housing adapted to have its front normally closed by the windshield and having its rear formed with ventilating openings, means carried centrally of the housing for shifting the windshield to open position to provide for the intake of air in a direction over-head with respect to the occupants of the vehicle, and controllable means hinged to the housing adjacent said shiftable means and coacting with said openings to provide for the air passing rearwardly from the latter, when the windshield is shifted to open position, in a direction towards the feet of the occupants of the vehicle simultaneously with the travel of the air in an overhead direction.

2. In an adjuster for windshields of motor vehicles an open front housing adapted to have its front normally closed by the windshield and having its rear formed with ventilating openings, means carried centrally of the housing for shifting the windshield to open position to provide for the intake of air in a direction overhead with respect to the occupants of the vehicle, controllable means hinged to the housing adjacent said siftable means and coacting with said openings to provide for the air passing rearwardly from the latter, when the windshield is shifted to open position, in a direction towards the feet of the occupants of the vehicle simultaneously with the travel of the air in an overhead anti-rattling means interposed between the windshield and rear of the housing, means for fixedly securing the rear end of said anti-rattling means with the rear of the housing, and means for fixedly securing the forward end of said anti-rattling means to the windshield frame.

3. An adjuster for the windshields of automobiles comprising an open front housing normally closed by the windshield and having adjustable ventilating openings at the rear thereof, means carried by the housing for shifting the windshield to open position to provide for the intake of air in a direction overhead with respect to the occupants of the vehicle, and adjustable curved deflectors hinged to the top of the housing at the rear thereof and coacting with said openings for selectively directing the incoming air, when the windshield is shifted to open position, straight back without striking the face of an occupant and downwardly towards the feet of an occupant.

4. An adjuster for the windshields of automobiles comprising an open front housing normally closed by the windshield and having adjustable ventilating openings at the rear thereof, means carried by the housing for shifting the windshield to open position to provide for the intake of air in a direction overhead with respect to the occupants of the vehicle, and adjustable curved deflectors hinged to the top of the housing at the rear thereof and coacting with said openings for selectively directing the incoming air, when the windshield is shifted to open position, straight back without striking the face of an occupant and downwardly towards the feet of an occupant, and anti-rattling means adapted to be secured at one end to the windshield and at its other end to the front of said housing.

5. An adjuster for windshields of automobiles comprising an open front housing normally closed by the windshield, means carried by the housing for shifting the windshield and provided at its rear with spaced sets of ventilating openings to open position to provide for the intake of air in a direction upwardly with respect to said housing and overhead with respect to the occupants of the vehicle, and controllable deflectors hinged to the rear of said housing at each end thereof, each independently controlled and coacting with a set of openings for directing the air straight back without striking the face of an occupant and downwardly towards the feet of the occupants.

6. An adjuster for windshields of automobiles comprising an open front housing normally closed by the windshield and provided at its rear with spaced sets of ventilating openings, means carried by the housing for shifting the windshield to open position to provide for the intake of air in a direction upwardly with respect to said housing and overhead with respect to the occupants of the vehicle, controllable deflectors hinged to the rear of said housing at each end thereof, each independently controlled and coacting with a set of openings for directing the air straight back without striking the face of an occupant and downwardly towards the feet of the occupants, and anti-rattling means connected at one end to the windshield and at its other end to said housing.

7. An adjuster for the windshields of motor vehicles comprising an open front housing normally closed by the windshield, means carried by the housing to shift the windshield to open position to provide for the intake of air in an upward direction with respect to said housing and further in a direction overhead with respect to the occupants of the vehicle, a controllable air inlet means at each end of the rear of said housing, and spaced, selectively adjustable air deflectors hinged to and projecting rearwardly from the housing and each coacting with an air controllable air inlet means to deflect the incoming air in the desired direction.

8. An adjuster for the windshields of motor vehicles comprising an open front housing normally closed by the windshield, means carried by the housing to shift the windshield to open position to provide for the intake of air in an upward direction with respect to said housing and further in a direction overhead with respect to the occupants of the vehicle, controllable air inlet means at each end of said housing, selectively adjustable air deflectors projecting rearwardly from the housing and coacting with said air controllable intake means to deflect the incoming air in the desired direction, and anti-rattling means adapted to be connected at one end to the windshield and at its other end to said housing.

9. In an adjuster for windshields of motor vehicles an open front housing for ventilating purposes adapted to be carried by the vehicle and normally closed by the windshield when the latter is in non-shifted position, said housing having ventilating openings at its rear, means carried by the housing for shifting the windshield to open position to provide for the intake of air to travel in an upward direction with respect to the front of the housing and overhead with respect to the occupants of the vehicle, and means projecting from the rear of the housing and coacting with said openings for directing the incoming air straight back from the housing without striking the face of the occupants of the vehicle and further for directing the air downwardly in a direction at the rear of the housing towards the feet of an occupant.

10. In an adjuster for windshields of motor vehicles an open front housing adapted to be carried by the vehicle and normally closed by the windshield when the latter is in non-shifted position for ventilating purposes, means carried by the housing for shifting the windshield to open position to provide for the intake of air in a direction upwardly with respect to the housing and further in a direction overhead with respect to the occupants of the vehicle, means for directing the incoming air straight back without striking the face of the occupants of the vehicle and further for directing the air downwardly in a direction towards the feet of an occupant, and anti-rattling means adapted to be secured at one end to said windshield and at its other end to the housing.

11. An open front housing adapted to be secured to a vehicle and normally closed by the windshield when the latter is in normal position, said housing provided at each end of its rear with an air intake, means for selectively controlling each of said air intakes, means for selectively directing the travel of the air passing through said intakes in different directions rearwardly with respect to said housing, and anti-rattling means adapted to be secured at one end to the windshield and at its other end to the rear wall of said housing.

12. An open front and normally closed rear housing adapted to be secured to the cowl of a vehicle and having its front normally closed by the lower portion of a windshield when the latter is in normal position, said housing provided at each end of its rear with a set of ventilating openings, means within the housing and operated from the rear thereof for selectively controlling each of said sets, and hinged, adjustable means carried at each end of the rear of the housing and coacting with said ventilating openings and providing for selectively directing the travel of the air passing through said openings in different directions rearwardly with respect to said housing.

13. An open front housing adapted to be secured to the cowl of a vehicle and having its front normally closed by the lower portion of a windshield when the latter is in normal vertical position, said housing provided at each end of its rear with a set of ventilating openings, means within the housing and operated from the rear thereof for selectively controlling each of said sets, hinged, adjustable means carried at each end of the rear of the housing and coacting with said ventilating openings and providing for selectively directing the travel of the air passing through said openings in different directions rearwardly with respect to said housing, and forwardly directly anti-rattling means positioned within the housing, adapted to have its forward end secured to said portion of the windshield and its rear end to the rear wall of the housing.

14. A windshield adjuster for automobiles comprising an open front housing having its front normally closed by the windshield, means carried by the housing centrally thereof for shifting the windshield to open position to provide for the intake of air in a direction upwardly with respect to said housing and overhead with respect to the occupants of the vehicle, and selectively, controllable means at each end of the rear of the housing, adjacent and forwardly with respect to said shifting means for directing the air straight back from the rear of the housing without striking the face of an occupant and downwardly toward the feet of the occupants.

15. A windshield adjuster for automobiles comprising an open front housing normally closed by a windshield when the latter is in normal position and formed of a central portion and a pair of outer portions, said central portion being of greater width than and projecting rearwardly from said outer portions, said outer portions having the rear wall thereof provided with ventilating openings, means within said outer portions for controlling said openings, means carried by said central portion for shifting the windshield to open position to provide for the intake of air in a direction upwardly with respect to said housing and overhead with respect to the occupants of the vehicle, and selected, controlling means hinged to the rear of said outer portions for directing the air straight back from the rear of the housing without striking the face of and downwardly towards the feet of the occupants of the vehicle.

16. A windshield adjuster for automobiles comprising an open front housing normally closed by a windshield when the latter is in normal position and formed of a central portion and a pair of outer portions, said central portion being of greater width than and projecting rearwardly from said outer portions, said outer portions having the rear wall thereof provided with ventilating openings, means within said outer portions for controlling said openings, means carried by said central portion for shifting the windshield to open position to provide for the intake of air in a direction upwardly with respect to said housing and overhead with respect to the occupants of the vehicle, a curved guide hinged to the rear of each outer portion and coacting with the ventilating openings formed in the latter, and means connected to each guide for shifting it to provide for directing the air straight back from the rear of the housing without striking the face of and downwardly towards the feet of the occupants of the vehicle.

In testimony whereof, I affix my signature hereto.

SWENEY MUNSON.